(12) United States Patent
Mehr (10) Patent No.: US 6,634,677 B2
(45) Date of Patent: Oct. 21, 2003

(54) PIPE CONNECTIONS AND METHODS FOR CONNECTING PIPES

(76) Inventor: Ralph R. Mehr, PO Box 21668, Tel Aviv 61216 (IL)

( * ) Notice: Subject to any disclaimer, the term of this patent is extended or adjusted under 35 U.S.C. 154(b) by 0 days.

(21) Appl. No.: 10/032,038

(22) Filed: Dec. 31, 2001

(65) Prior Publication Data

US 2002/0053798 A1 May 9, 2002

Related U.S. Application Data

(63) Continuation-in-part of application No. PCT/US99/14763, filed on Jun. 30, 1999, which is a continuation of application No. 08/934,219, filed on Sep. 19, 1997, now Pat. No. 5,927,763.

(51) Int. Cl.[7] .................................. F16L 21/08
(52) U.S. Cl. .......................... 285/305; 285/382; 285/3; 285/382.2; 29/505
(58) Field of Search .................... 285/2, 3, 305, 285/382, 382.1, 382.2; 29/505

(56) References Cited

U.S. PATENT DOCUMENTS

| | | | | |
|---|---|---|---|---|
| 656,765 A | * | 8/1900 | Copeland | 285/322 |
| 2,127,284 A | * | 8/1938 | Board | 285/341 |
| 2,597,482 A | * | 5/1952 | Harrison et al. | 285/305 |
| 3,822,074 A | * | 7/1974 | Welcker | 285/305 |
| 4,289,339 A | * | 9/1981 | Hansen | 285/305 |
| 4,401,324 A | * | 8/1983 | Rumble | 285/90 |
| 4,519,638 A | * | 5/1985 | Yodoshi et al. | 285/305 |
| 4,708,663 A | * | 11/1987 | Eckart | 439/469 |
| 5,239,964 A | * | 8/1993 | Diener et al. | 123/456 |
| 5,779,283 A | * | 7/1998 | Kimura et al. | 285/305 |
| 5,927,763 A | * | 7/1999 | Mehr | 285/305 |

* cited by examiner

*Primary Examiner*—Eric K. Nicholson
(74) *Attorney, Agent, or Firm*—Mark M. Friedman (57) ABSTRACT

A pipe joint assembly includes a cylindrical pipe and a pipe element having a generally cylindrical terminal portion for receiving the end of the pipe. The terminal portion is formed with a roughly straight open ended channel extending in a direction tangential to, but intersecting, the cylindrical pipe. A lock pin is insertable along the open ended channel so as to cause local inward deformation of the end, thereby locking the end and the pipe element together. The lock pin has a parallel-sided shaft portion of minimum transverse dimension d and a tapered portion of length l tapering to a point, where l is no less than twice d and is no greater than four times d. This geometry facilitates insertion of the lock pin through a combined linear and rotational displacement which is highly effective for ensuring effecting and reliable interconnection.

14 Claims, 6 Drawing Sheets

PIPE CONNECTIONS AND METHODS FOR CONNECTING PIPES

This is a continuation-in-part of PCT Patent Application No. PCT/US99/14763 filed Jun. 30, 1999, which is a continuation of U.S. Patent Application No. 08/934,219 filed Sep. 19, 1997, now issued as U.S. Pat. No. 5,927,763.

FIELD AND BACKGROUND OF THE INVENTION

The present invention relates to pipes for carrying water and the like and, in particular, it concerns methods for connecting pipes and the corresponding pipe elements and connections.

Various techniques are known for connecting water pipes in fire prevention and domestic water supply systems. For many years, the only alternative to threading or flange connections was a labor intensive welding processes. More recently, a number of quick-assembly systems have been marketed. These systems seek to reduce the labor costs of assembly by providing various types of mechanical engagement to hold pipe ends together without requiring welding.

One quick-assembly system of particular interest is disclosed in U.S. Pat. No. 5,040,831 and is available commercially in the U.S. under the tradename POZ-LOK® from Southwestern Pipe, Inc. This system employs specially molded connector fittings which have slots on opposite sides. A pipe is inserted into the connector and a U-shaped bracket is hammered in through the slots. The bracket creates indents in the sides of the pipe, thereby retaining the pipe within the connector.

Another system is proposed by U.S. Pat. No. 5,779,283 to Kimura et al. This system is similar to the POZ-LOK® system, but uses a "key" member inserted in a channel formed in a connector on just one side of the pipe. The key member is disclosed as either a flat plate with a raised ridge or as a round pin. In the case of the round pin, the front of the pin is formed with a threaded section for fastening after insertion by use of a nut on the opposite side of the connector.

The POZ-LOK® and Kimura systems have at least two major advantages. Firstly, they are extremely quick and simple to assemble, requiring only a hammer to drive in the brackets. Secondly, the systems readily allows disassembly and subsequent reassembly without compromising the joint structure. However, the proposed systems are still far from ideal. In each case, precise alignment of the brackets during assembly is ensured by providing a heavy specially produced molded connector. The manufacturing cost of these connectors offsets to a large extent the cost advantages of labor savings. This is true even for iron piping. In the case of the increasingly popular copper piping, the manufacturing costs of such bulky connectors would be unacceptably high.

A further problem with practical implementation of systems such as that of Kimura et al. is to achieve reliable interconnection without risking damaging the inner pipe during insertion of the key member. Specifically, as best seen in FIG. 2 of the Kimura et al. reference, the depression formed in the inner pipe by the round pin of Kimura et al. is only a small proportion of the diameter of the pin. Although such a small indentation may be effective at low pressures, it risks unintended release in higher pressure applications. Furthermore, even if the threaded end of the pins were omitted, attempts to make a deeper indentation would be accompanied by risks of damaging the inner pipe due to shear forces in the direction of insertion of the pin. This is particularly true in thin-walled pipe applications.

In order to produce a quick-fit system with lower production costs, a number of systems use thin walled connectors which can readily be produced from modified sections of standard piping. An example of such a system is commercially available in the U.S. under the tradename PRESSFIT™ from VICTAULIC®.

The PRESSFIT™ system employs a thin walled connector with an internal O-ring seal positioned around the end of a pipe. Engagement of the pipe within the connector is achieved using a special hydraulic circumferential press tool which makes a circumferential indent around the joint through both the connector and the pipe, thereby permanently fixing them together.

The PRESSFIT™ system also suffers from a number of disadvantages. Firstly, assembly requires use of an expensive specialized tool which is also very heavy and awkward to handle. Furthermore, the jaws of the tool itself are specific to a given diameter of pipe such that considerable time and labor is required to switch the jaws each time a different gauge of pipe is encountered. Additionally, the joints produced are permanent and can only be dissembled by cutting out and replacing a section of pipe. This renders maintenance and service costs high.

There is therefore a need for a quick-fit method for connecting thin-walled pipes which does not require heavy molded fittings or specialized tools, and which can reliably be non-destructively assembled and subsequently dissembled for servicing. It would also be advantageous to provide pipe elements and connections corresponding to such methods.

SUMMARY OF THE INVENTION

The present invention is a method for connecting pipes in which mechanical engagement is achieved by insertion of a pin-like element.

According to the teachings of the present invention there is provided, a pipe joint assembly comprising: (a) a cylindrical pipe having an end with a given external pipe diameter; (b) a pipe element having a generally cylindrical terminal portion with an internal diameter no less than the given external pipe diameter for receiving the end, the terminal portion being formed with a substantially linear open ended channel extending in a direction substantially tangential to, but intersecting, the cylindrical pipe; and (c) a lock pin for insertion along the open ended channel so as to cause local inward deformation of the end, thereby locking the end and the pipe element together, wherein the lock pin has a parallel-sided shaft portion of minimum transverse dimension d and a tapered portion of length l tapering to a point, wherein l is no less than twice d and no greater than four times d.

According to a further feature of the present invention, the open ended channel is configured to allow insertion of the lock pin at an angle to a direction of extension of the open ended channel such that, on insertion of the lock pin within the channel, surfaces of the tapered portion bear simultaneously on surfaces of the end and of the open ended channel.

According to a further feature of the present invention, the open ended channel is configured such that, when the lock pin is inserted, the lock pin forms a depression of depth no less than half of d.

According to a further feature of the present invention, the lock pin is formed with l equal to about three times d.

According to a further feature of the present invention, the lock pin is formed with a pre-defined weakened region adjacent to a junction of the parallel-sided shaft portion and the tapered portion.

According to a further feature of the present invention, the lock pin has a substantially circular cross-section.

According to a further feature of the present invention, the minimum lateral dimension d is no snore than 20% of the given external pipe diameter.

According to a further feature of the present invention, the minimum lateral dimension d is between about 5% and about 15% of the given external pipe diameter.

According to a further feature of the present invention, the terminal portion has a wall of thickness no more than about 10% of the given external pipe diameter.

According to a further feature of the present invention, the terminal portion features an annular recess formed around an internal surface of the terminal portion.

According to a further feature of the present invention, the terminal portion has a connector end, the open ended channel being located between the connector end and the annular recess.

According to a further feature of the present invention, there is also provided a sealing element located within the annular recess.

According to a further feature of the present invention, the pipe element is an angled connector.

According to a further feature of the present invention, the pipe element is a three-way connector.

There is also provided according to the teachings of the present invention, a method for interlocking an end of a cylindrical pipe of given external diameter within a connector formed with an internal bore for receiving the pipe end and an open-ended channel extending in a direction substantially tangential to the internal bore by use of a lock pin having a tapered end portion and a length, the method comprising the steps of: (a) inserting the end of the pipe within the internal bore so that a surface of the open-ended channel and a surface of the pipe end together form a wedge-shaped crevice; (b) positioning the lock pin with its tapered end portion lodged within the wedge-shaped crevice so that the length of the lock pin is non-parallel to the extensional direction of the open-ended channel; and (c) applying force to the lock pin so as to advance the lock pin through a combined linear and rotational displacement so as to cause local inward deformation of the pipe end until the lock pin reaches a locking position in which the length of the lock pin lies parallel to the extensional direction of the open-ended channel, thereby locking the pipe end within the connector.

According to a further feature of the present invention, the lock pin forms a depression in the pipe end to a depth of at least half a thickness of the lock pin.

According to a further feature of the present invention, the tapered end of the lock pin is detached after the lock pin has reached the locking position.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method for connecting pipes, and corresponding pipe elements and connections.

The principles and operation of methods and pipe elements according to the present invention may be better understood with reference to the drawings and the accompanying description.

Figure 1:
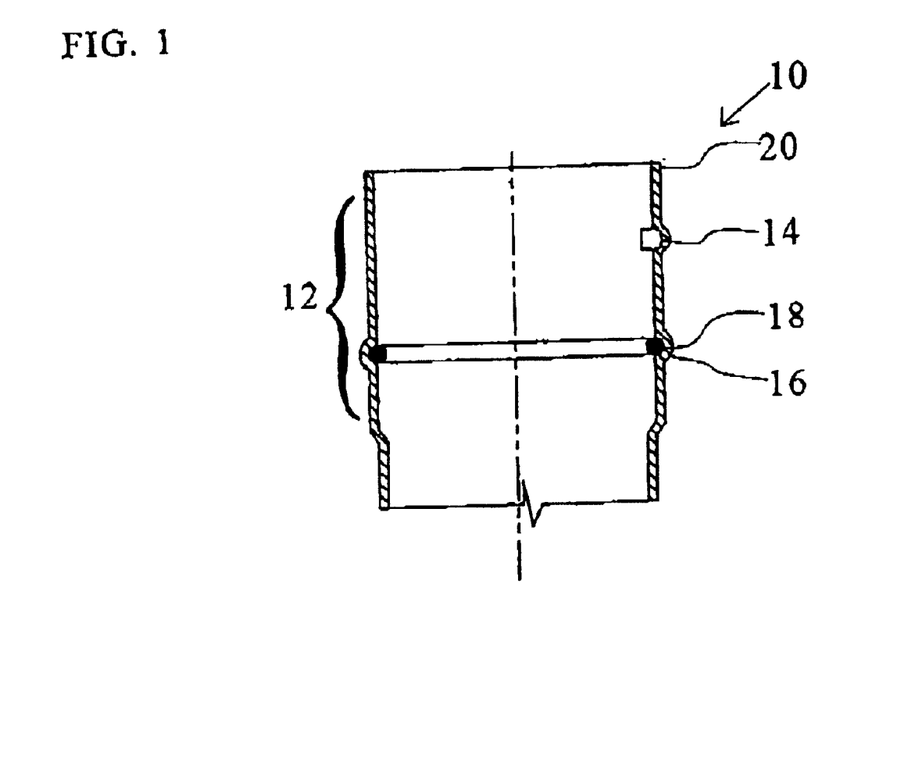
FIG. 1 is a longitudinal cross-sectional view through a pipe element, constructed and operative according to the teachings of the present invention, for receiving a pipe.
Figure 2:
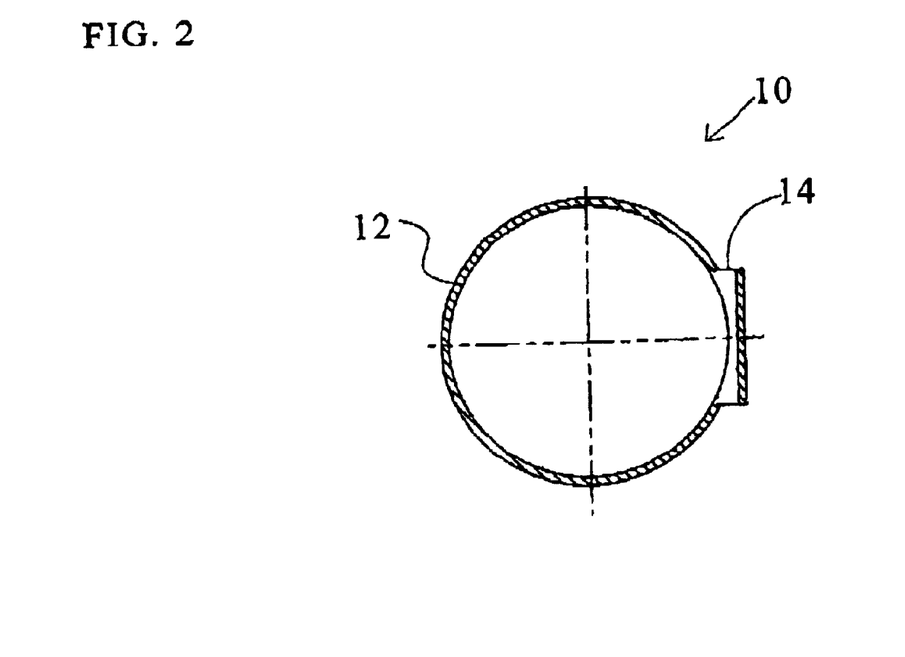
FIG. 2 is a transverse cross-sectional view through the pipe element of FIG. 1.

Referring now to the drawings, FIGS. 1 and 2 show a pipe element 10, constructed and operative according to the teachings of the present invention, for forming a connection with the end of a cylindrical pipe of given external diameter. Generally speaking, pipe element 10 has a generally cylindrical terminal portion 12 which has been broadened so as to have an internal diameter D sufficient to receive the end of a pipe. A part of the wall of terminal portion 12 is outwardly deformed so as to define a substantially linear open ended channel 14 in a direction substantially tangential to the cylindrical internal surface of terminal portion 12.

Channel 14, the main defining feature of the present invention, may take a wide range of forms. It defines a path of insertion for a pin-like locking element along a line described as "substantially tangential" to the cylindrical internal surface of terminal portion 12. "Tangential", in this context, is used to refer to a line tangential to the circular cross-section taken perpendicular to the longitudinal axis of the cylindrical internal surface. The line is described as "substantially" tangential in that it may be radially displaced outwards from the actual circle of the internal surface. Channel 14 may also be angled out of the plane of the cross-section by up to about 20° without adversely affecting its operation.

Channel 14 is open ended, i.e., it has at least one and typically both ends open, to provide an accessible path for insertion of the pin-like locking element. The openings do not, however, have to correspond to the full thickness of the locking element since the pin-like form of the element will enable it to open up its own path as it is forcefully inserted.

Preferably, an additional part of the wall of the terminal portion is outwardly deformed to form an annular recess 16 around the internal surface for receiving an O-ring sealing element 18. For reasons that will become clear, channel 14 is located between the end 20 of terminal portion 12 and annular recess 16.

It will be appreciated that terminal portion 12 with the required features may readily be produced in the end of a pipe element equivalent to the pipe with which it is to be connected. Firstly, the diameter of terminal portion 12 is increased sufficiently to form the required diameter to function as a socket for receiving another pipe end. Then, annular recess 16 and channel 14 are formed. The techniques for increasing the diameter and for forming an annular recess are well known, typically involving heating followed by application of pressure with an appropriately shaped clamping tool. According to the teachings of the present invention, channel 14 can be formed in a similar manner by use of a clamping tool with a straight-edged projection. The cross-section of the projection, and hence of channel 14, is not critical, but is typically either rounded or V-shaped.

Production of the required features in terminal portion 12 may be divided in different ways between a manufacturing stage and the installation procedure. At one extreme, the entire process of broadening, forming annular recess 16 and forming channel 14 could be performed on-site during installation. This option would allow the ends of long pipe sections to be connected directly without requiring the use of additional connector elements. Alternatively, pipe elements 10 could be produced and supplied ready for use without further adaptation.

Since terminal portion 12 is preferably formed from a section of pipe, the wall thickness of terminal portion 12 is typically no more than about 10% of the internal diameter. Thus the quantities of material needed for the connection are not a significant addition to the overall costs of pipe installation. Furthermore, the production costs of pipe element 10 are extremely low, requiring only straightforward adaptation of an otherwise standard pipe end.

The aforementioned economy of material is particularly important in the context of copper piping, as mentioned earlier. Since all fittings must be made of compatible metals to avoid rapid corrosion of the piping, the heavy molded fittings of the prior art are prohibitively expensive. In contrast, the present invention provides pipe elements for forming connections which require nominal additional cost for materials.

Clearly, the present invention may be employed for a simple pipe-to-pipe connection, or for angle joints and multiple-pipe junctions. The term "pipe element" is used generically herein in the description and claims to refer to an element for attachment to form a connection in any of these cases. Thus, the pipe element may be a regular length of pipe, an adapter between different gauge pipes, an angled connector of any angle, or a three-way or four-way connector. Where two or more connections are made by a single pipe element, the pipe element may be provided with a number of terminal portions each according to the present invention.

Figure 3:
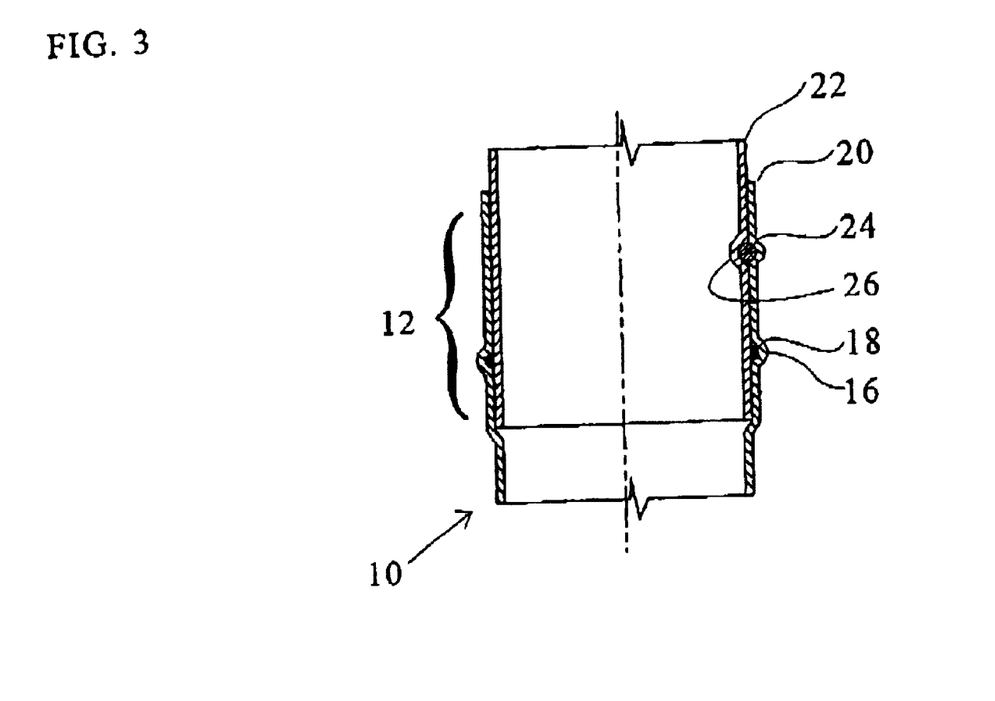
FIG. 3 is a longitudinal cross-sectional view through a pipe connection, constructed and operative according to the teachings of the present invention, employing the pipe element of FIG. 1.
Figure 4:
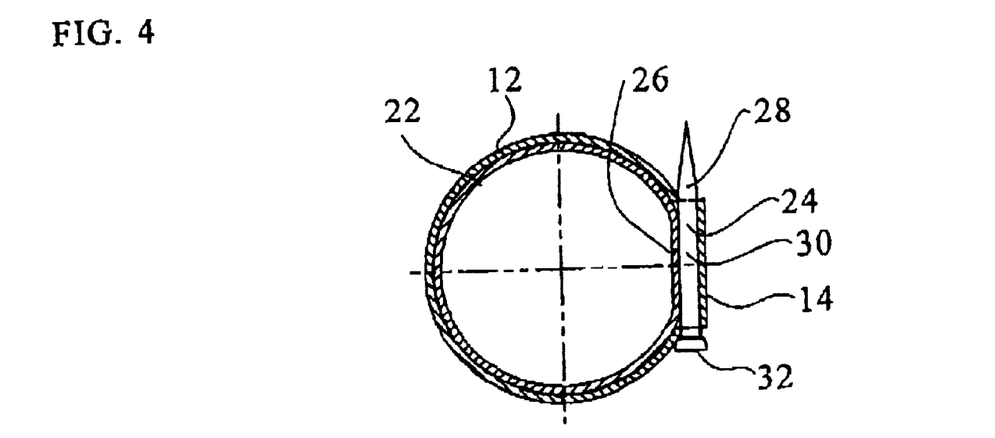
FIG. 4 is a transverse cross-sectional view through the pipe connection of FIG. 3.

Turning now to FIGS. 3 and 4, these illustrate the formation of a connection using pipe element 10. First, the adjacent end of a pipe 22 is inserted into terminal portion 12 to its full extent of travel such that O-ring sealing element 18 forms a seal between pipe 22 and pipe element 10. A pin-like element 24 is then forced along channel 14, typically by being struck a number of times with a hammer, so as to be forced along channel 14 between pipe 22 and pipe element 10. This causes local inward deformation 26 of pipe 22, thereby locking pipe 22 and pipe element 10 together.

As with all fittings for metal pipes, pin-like element 24 should be made of chemically compatible materials. For copper piping, bronze may be used. For iron pipes, a steel pin is suitable.

Element 24 is described as "pin-like" in that it is a simple, straight, somewhat sharp element. Pin-like element 24 preferably has a pointed or wedge-shaped end 28. This helps to guide element 24 along channel 14 and exerts gradually increasing deforming force against the wall of pipe 22. The main body 30 of element 24 is preferably roughly cylindrical so as to act as a uniform locking element. A slightly enlarged head 32 preferably serves to prevent over-insertion and to facilitate removal of element 24, if required. In most cases, various types of nails already commercially available provide all of the preferred features of element 24.

Disassembly of the connection for maintenance and inspection may be achieved easily and non-destructively by knocking and/or prizing out element 24 and pulling pipe 22 and pipe element 10 apart. Similarly, the connection can be reassembled in the same way as originally formed.

It will be noted that, unlike the POZ-LOK® system described above, the present invention creates a local deformation on only one side of pipe 22. It has been found that this one-sided locking is sufficient to effectively retain the connection together up-to and beyond all required standards.

As mentioned earlier, annular recess 16 is further removed from end 20 of terminal portion 12 than channel 14. This ensures that the openings of channel 14 are external to the seal formed by O-ring element 18 between pipe 22 and pipe element 10.

Turning now to FIGS. 5–8, it should be noted that the present invention offers a particularly effective and reliable form of interconnection due to certain geometric relations between the dimensions and/or proportions of the components used. These relations will now be discussed in more detail.

Figure 7A:
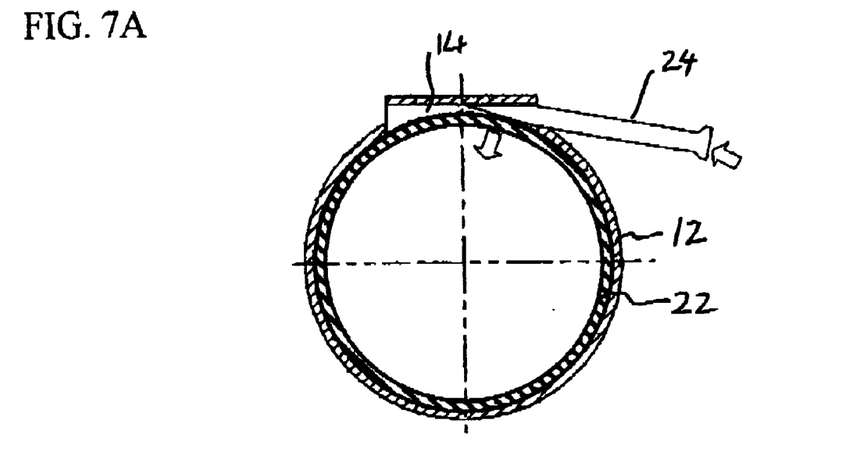
FIGS. 7A–7C show three stages in the insertion of a lock pin to form a pipe joint assembly according to the teachings of the present invention.
Figure 7B:
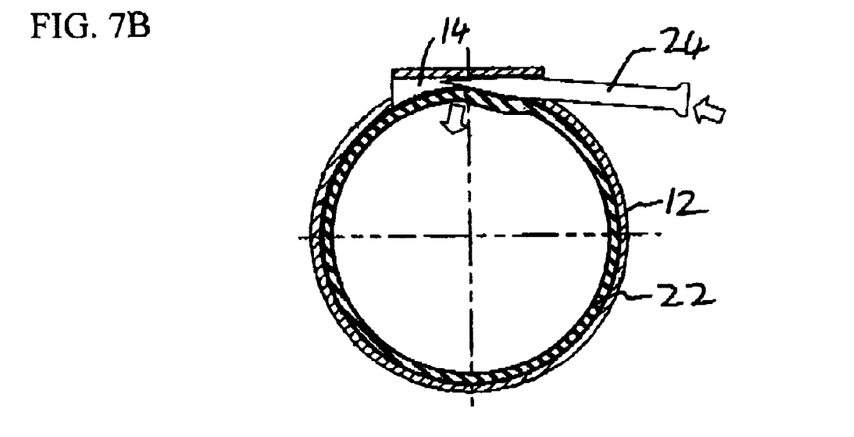
Figure 7C:
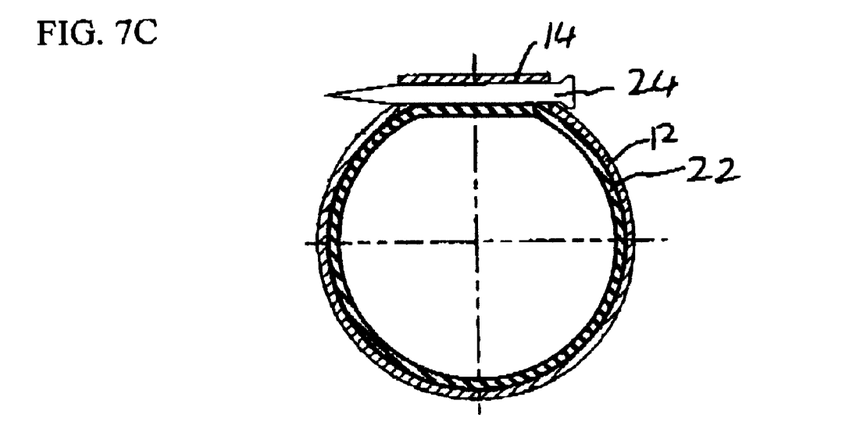
Figure 8:
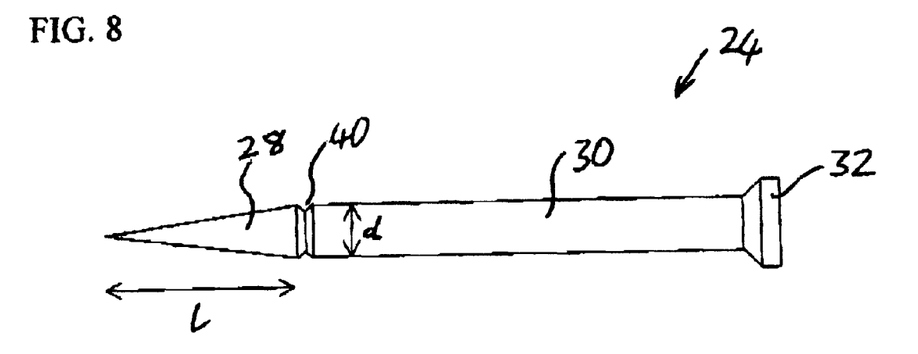
FIG. 8 is an enlarged plan view of a preferred implementation of a lock pin for use in the joint assembly and method of the present invention.

Turning first briefly to FIG. 8, this shows a preferred implementation of pin-like element 24, also referred to as a "lock pin". As before, lock pin 24 has a parallel-sided shaft portion 30 and a tapered portion 28. A minimum transverse dimension of the parallel-sided shaft portion is labeled d. In the preferred case of a pin with cylindrical symmetry, d corresponds to the diameter of the parallel-sided shaft portion. Tapered portion 28 tapers from this dimension down to a point over a length l. It is a particular feature of most preferred implementations of the present invention that the length l of tapered portion 28 is no less than twice transverse dimension d and no greater than four times d. In other words, it is a particularly preferred feature that the outer surface of tapered portion 28 are inclined so as to converge at an angle of between about 15° and about 30°, and most preferably at about 20° (corresponding to l of about three times d). This provides a particularly effective and reliable functionality, and corresponding method, as will now be described with reference to FIGS. 7A–7C.

Specifically, as seen in FIG. 7A, insertion of pipe end 22 within the internal bore of connector element 12 generates a wedge-shaped crevice between the opposing surfaces. Lock pin 24 is then positioned with its tapered end portion 28 lodged within this wedge-shaped crevice so that the length of lock pin 24 is non-parallel to the extensional direction of channel 14. In this position, surfaces of tapered portion 28 bear simultaneously on surfaces of the pipe end 22 and of channel 14. Force is then applied to advance lock pin 24 through a combined linear and rotational displacement (sequence of FIGS. 7A, 7B and 7C) so as to cause local inward deformation of the pipe end 22 until lock pin 24 reaches a locking position in which its length of lies parallel to the extensional direction of open-ended channel 14, Thereby locking pipe end 22 within the connector 12.

This combined linear and rotational displacement, described loosely as an "arcuate motion", is highly advantageous in achieving effective and reliable results. Specifically, the motion ensures that there is a significant component of the deforming forces acting radially inwards on the pipe end 22. This greatly reduces the risk of tearing of the pipe wall and facilitates formation of a deeper depression in the inner pipe end than would otherwise be possible without causing damage to the pipe.

Figure 5:
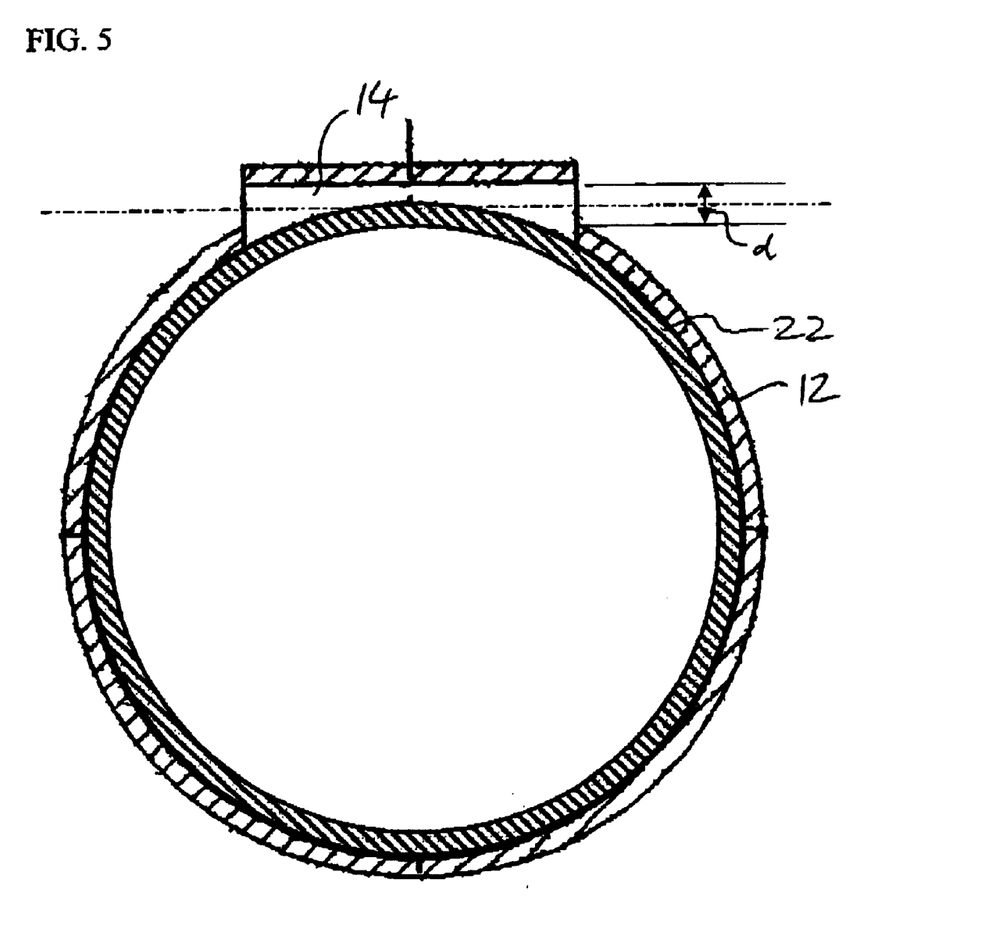
FIG. 5 is a schematic transverse cross-sectional view through the pipe joint assembly of the present invention prior to insertion of the lock pin.
Figure 6:
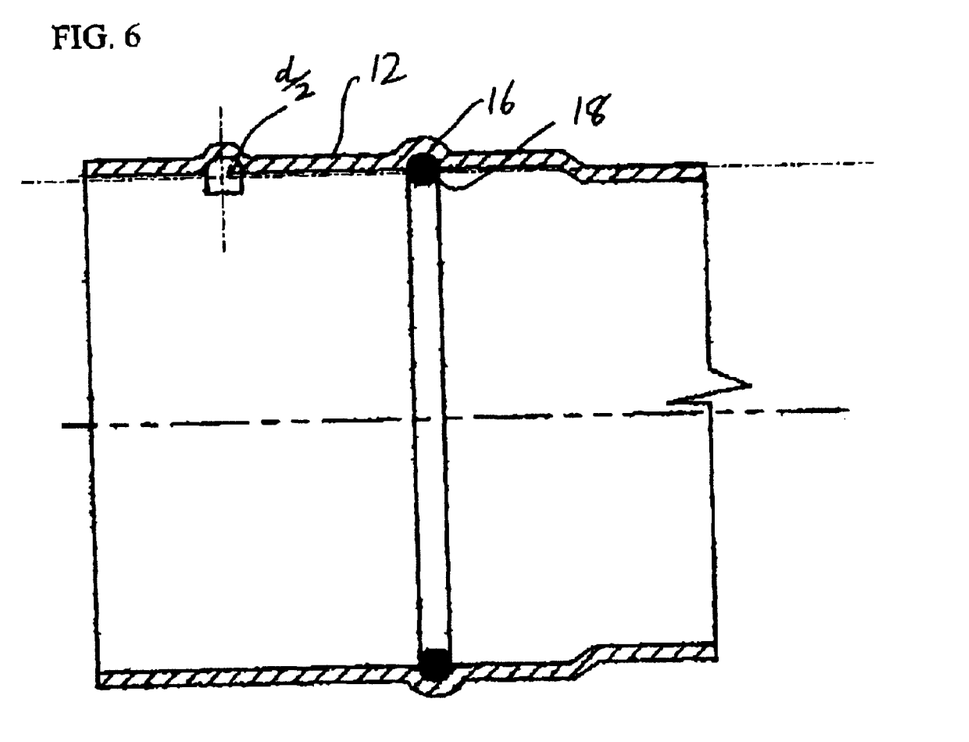
FIG. 6 is a view similar to FIG. 1 illustrating a preferred alignment of a central axis for insertion of the lock pin intersecting the inner cylindrical surface of the pipe connector element.

According to a further preferred geometric feature, channel 14 and lock pin 14 are preferably configured such that, when the lock pin is inserted, the lock pin forms a depression of depth no less than half of d. This feature is represented in FIG. 5 by a profile of thickness d aligned with channel 14 and showing a central axis as a dashed line. This dashed line preferably intersects the outline of inner pipe end 22. The thickness of lock pin 24 itself is preferably chosen to be no more than 20% of the external diameter of pipe 22, and most preferably between about 5% and about 15% of the given external diameter.

Finally, according to a further preferred feature of the joint assembly and corresponding method, lock pin 24 is formed with a pre-defined weakened region 40 (see FIG. 8) adjacent to a junction of parallel-sided shaft portion 30 and tapered portion 28. Weakened region 40 facilitates detachment of tapered end 28 of lock pin 24 after it has reached the locking position, both as a safety precaution and to prevent inadvertent removal of the lock pin.

It will be appreciated that the above descriptions are intended only to serve as examples, and that many other embodiments are possible within the spirit and the scope of the present invention.

What is claimed is:

1. A pipe joint assembly comprising:
   (a) a cylindrical pipe having an end with a given external pipe diameter;
   (b) a pipe element having a generally cylindrical terminal portion with an internal diameter no less than said given external pipe diameter for receiving said end, said terminal portion being formed with a substantially linear open ended channel extending in a direction substantially tangential to, but intersecting, said cylindrical pipe; and
   (c) a lock pin for insertion along said open ended channel so as to cause local inward deformation of said end, thereby locking said end and said pipe element together,
   wherein said lock pin has a parallel-sided shaft portion of minimum transverse dimension d and a tapered portion of length l tapering to a point, wherein l is no less than twice d and no greater than four times d.
   and wherein said lock pin is formed with a pre-defined weakened region adjacent to a junction of said parallel-sided shaft portion and said tapered portion.

2. The pipe joint assembly of claim 1, wherein said open ended channel is configured to allow insertion of said lock pin at an angle to a direction of extension of said open ended channel such that, on insertion of said lock pin within said channel, surfaces of said tapered portion bear simultaneously on surfaces of said end and of said open ended channel.

3. The pipe joint assembly of claim 1, wherein said open ended channel is configured such that, when said lock pin is inserted, said lock pin forms a depression of depth no less than half of d.

4. The pipe joint assembly of claim 1, wherein said lock pin is formed with l equal to about three times d.

5. The pipe joint assembly of claim 1, wherein said lock pin has a substantially circular cross-section.

6. The pipe joint assembly of claim 1, wherein said minimum lateral dimension d is no more than 20% of said given external pipe diameter.

7. The pipe joint assembly of claim 1, wherein said minimum lateral dimension d is between about 5% and about 15% of said given external pipe diameter.

8. The pipe joint assembly of claim 1, wherein said terminal portion has a wall of thickness no more than about 10% of said given external pipe diameter.

9. The pipe joint assembly of claim 1, wherein said terminal portion features an annular recess formed around an internal surface of said terminal portion.

10. The pipe joint assembly of claim 8, wherein said terminal portion has a connector end, said open ended channel being located between said connector end and said annular recess.

11. The pipe joint assembly of claim 9, further comprising a sealing element located within said annular recess.

12. A method for interlocking an end of a cylindrical pipe of given external diameter within a connector formed with an internal bore for receiving the pipe end and an open-ended channel extending in a direction substantially tangential to the internal bore by use of a lock pin having a tapered end portion and a length, the method comprising the steps of:
    (a) inserting the end of the pipe within the internal bore so that a surface of the open-ended channel and a surface of the pipe end together form a wedge-shaped crevice;
    (b) positioning the lock pin with its tapered end portion lodged within the wedge-shaped crevice so that the length of the lock pin is non-parallel to the extensional direction of the open-ended channel; and
    (c) applying force to the lock pin so as to advance the lock pin through a combined linear and rotational displacement so as to cause local inward deformation of the pipe end until the lock pin reaches a locking position in which the length of the lock pin lies parallel to the extensional direction of the open-ended channel, thereby locking the pipe end within the connector.

13. The method of claim 12, wherein the lock pin forms a depression in the pipe end to a depth of at least half a thickness of the lock pin.

14. The method of claim 12, further comprising detaching the tapered end of the lock pin has reached the locking position.

* * * * *